United States Patent
Duenser (10) Patent No.: US 9,924,571 B2
(45) Date of Patent: Mar. 20, 2018

(54) OPERATING CIRCUIT FOR ENERGIZING A LAMP, LED CONVERTER, AND METHOD FOR OPERATING AN OPERATING CIRCUIT

(71) Applicant: TRIDONIC GMBH & CO KG, Dornbirn (AT)

(72) Inventor: Mathias Duenser, Bludenz (AT)

(73) Assignee: TRIDONIC GMBH & CO KG (AT)

( * ) Notice: Subject to any disclaimer, the term of this patent is extended or adjusted under 35 U.S.C. 154(b) by 0 days.

(21) Appl. No.: 15/503,091

(22) PCT Filed: Oct. 19, 2015

(86) PCT No.: PCT/AT2015/050260
§ 371 (c)(1),
(2) Date: Feb. 10, 2017

(87) PCT Pub. No.: WO2016/058021
PCT Pub. Date: Apr. 21, 2016

(65) Prior Publication Data
US 2017/0238379 A1 Aug. 17, 2017

(30) Foreign Application Priority Data

Oct. 17, 2014 (DE) .................. 10 2014 221 101
Feb. 2, 2015 (AT) .................. GM35/2015

(51) Int. Cl.
*H05B 37/02* (2006.01)
*H05B 33/08* (2006.01)
(Continued)

(52) U.S. Cl.
CPC .......... *H05B 33/0815* (2013.01); *H02M 1/08* (2013.01); *H02M 3/33523* (2013.01);
(Continued)

(58) Field of Classification Search
CPC ............ H05B 33/0812; H05B 33/0815; H05B 33/0839
(Continued)

(56) References Cited

U.S. PATENT DOCUMENTS 6,018,467 A * 1/2000 Majid ............... H02M 3/33523
363/16
8,330,391 B2 * 12/2012 Wendt .................. H02M 3/3376
315/185 R
(Continued)

FOREIGN PATENT DOCUMENTS

EP          2141409 A2    11/2014
WO    WO 2010/035155 A2   4/2010

OTHER PUBLICATIONS

PCT Search Report, PCT/AT2015/050260 dated Mar. 30, 2016.
(Continued)

*Primary Examiner* — Thuy Vinh Tran
(74) *Attorney, Agent, or Firm* — Andrus Intellectual Property Law, LLP (57) ABSTRACT

An operating circuit for energizing a lamp (5) comprising at least one light emitting diode (6) has a primary side (11) and a secondary side (12) that is electrically isolated from the primary side. The operating circuit comprises a clocked converter (14) that has a primary coil and a secondary coil (18). The operating circuit further comprises a detection device (20) for determining an output voltage ($V_{out}$) of the operating circuit; the detection device (20) comprises an inductor (21) which is located on the primary side (11) of the operating circuit and which is inductively coupled to the secondary coil (18).

12 Claims, 6 Drawing Sheets

(51) Int. Cl.
*H02M 3/335* (2006.01)
*H02M 1/08* (2006.01)

(52) U.S. Cl.
CPC ..... *H05B 33/0848* (2013.01); *H05B 33/0812* (2013.01); *H05B 33/0839* (2013.01)

(58) Field of Classification Search
USPC ........ 315/209 R, 185 R, 224, 225, 226, 276, 315/291, 308
See application file for complete search history.

(56) References Cited

U.S. PATENT DOCUMENTS

| | | | |
|---|---|---|---|
| 8,605,462 B2* | 12/2013 | Yang | H02M 3/3376 363/21.02 |
| 8,897,036 B2* | 11/2014 | Chen | H02M 1/38 363/21.02 |
| 2012/0249889 A1 | 10/2012 | Padaki et al. | |
| 2014/0152192 A1 | 6/2014 | Kim | |

OTHER PUBLICATIONS

Fairchild Semiconductor, AN-9729 LED Application Design Guide Using Half-Bridge LLC Resonant Converter for 100W Street Lighting, Rev. 1.0.1 Nov. 16, 2012 (www.fairchildsemi.com).

* cited by examiner

OPERATING CIRCUIT FOR ENERGIZING A LAMP, LED CONVERTER, AND METHOD FOR OPERATING AN OPERATING CIRCUIT

CROSS REFERENCE TO RELATED APPLICATION

The present application is the U.S. national stage application of International Application PCT/AT2015/050260, filed Oct. 19, 2015, which international application was published on Apr. 21, 2016 as International Publication WO 2016/058021 A1. The International Application claims priority to German Patent Application 10 2014 221 101.8, filed Oct. 17, 2014 and Austria Patent Application GM35/2015 filed Feb. 2, 2015.

FIELD OF THE INVENTION

The invention relates to an operating circuit for energizing a lamp, an LED converter, and a method for operating an operating circuit of this type. The invention relates in particular to such devices and methods, with which a lamp is supplied with power, in particular a lamp comprising one or more light emitting diodes, having an operating circuit with an electrical isolation.

BACKGROUND OF THE INVENTION

Converters with electrical isolation transfer galvanically uncoupled electrical energy from an input side to an output side. Converters of this type are used in various applications for current or voltage supply, as in clocked switching power supplies, for example. With clocked converters, controllable switches, which can be designed in the form of circuit breakers, are used and operated in a clocked manner in order to transfer energy to the output side. Galvanically uncoupled energy transference can be obtained through the use of a transformer or other transducer. Electrical isolation is required, by way of example, for safety reasons in operating devices for lamps in order to isolate an ELV (Extra Low Voltage) region from regions of higher voltage by means of a potential barrier.

In order to control or regulate the converter, data regarding an output voltage of the converter may be necessary. With converters clocked on the primary side, this can be achieved by measuring the output voltage on a secondary side of the converter, and transferring the data over the potential barrier to the primary side. Optocouplers may be used for this. This leads to higher costs and increased complexity.

There is a demand for devices and methods with which the circuit technology complexity and/or costs associated with conventional devices for bypassing a potential barrier can be reduced or avoided. There is a demand for such devices and methods that enable a control or regulation of the output power while in operation.

SUMMARY OF THE INVENTION

An operating circuit, an LED converter, and a method having the features specified in the independent claims are defined according to exemplary embodiments. The dependent claims define embodiments.

An inductor on a primary side of an operating circuit is used according to exemplary embodiments of the invention, in order to measure an output voltage of the operating circuit for a lamp. The inductor is inductively coupled to a secondary coil of a converter in the operating circuit.

The inductor may comprise, for example, a winding differing from the primary coil of the converter.

In order to determine the output voltage, a maximum value of the voltage at the inductor can be measured in a least one switching cycle of the clocked converter. A voltage correction value can be subtracted from the maximum value, in order to determine the output voltage. The voltage correction value may be a function of an output current of the operating circuit. The voltage correction value may be a function of a differential resistor of a diode, and of the output current.

An operating circuit for powering a lamp that comprises at least one light emitting diode is defined according to one exemplary embodiment. The operating circuit has a primary side, and a secondary side galvanically isolated therefrom. The operating circuit comprises a clocked converter. The operating circuit comprises a detection device for determining an output voltage of the operating circuit, wherein the detection device comprises an inductor disposed on the primary side of the converter, which is inductively coupled to a secondary coil of the secondary side of the converter.

In this manner, a voltage measured with an inductor on the primary side can be processed in order to determine the output voltage. A measurement of the output voltage in the secondary side circuit, and a returning thereof over the SELV barrier is no longer absolutely necessary. A power regulation can be obtained as a function of the voltage measured with the inductor on the primary side, without having to measure the output voltage in the secondary side circuit.

The detection device can be configured to determine the output voltage as a function of the voltage at the inductor, and as a function of an output current of the operating circuit. As result, any voltage drop between the secondary coil and an output of the operating circuit can be taken into account.

The detection device can be configured to determine the output voltage as a function of a maximum value of the voltage at the inductor, and as a function of the output current. The maximum value can be determined, respectively, in at least every second switching cycle of the clocked converter. The detection device can be configured to determine the output voltage as the difference between the maximum value of the voltage and a voltage correction value that is a function of the output current.

A diode may be provided between the secondary coil and an output of the operating circuit. The voltage correction value can be a product of the output current and a differential resistor of the diode.

The operating circuit can comprise a transformer for measuring the output current. The transformer can comprise at least one secondary side inductor, which is interconnected between the secondary coil and the diode, and a primary side inductor inductively coupled thereto.

The operating circuit can be configured to switch, in a clocked manner, at least one controllable switch of the converter as a function of the determined output voltage.

The operating circuit can be configured to set a switching frequency and/or a switching threshold value for the at least one controllable switch as a function of the output voltage.

The operating circuit can be configured for regulating and/or limiting the power of an output power of the operating circuit as a function of the output voltage.

The inductor, which is inductively coupled to the secondary coil, may differ from a primary coil of the converter.

The converter may be a primary side, clocked LLC resonance converter, having a half-bridge activation.

An LED converter according to an exemplary embodiment comprises the operating circuit according to an exemplary embodiment.

A system according to an exemplary embodiment comprises the LED converter according to an exemplary embodiment, and a lamp, which is connected to the output of the operating circuit. The lamp comprises at least one light emitting diode.

According to an exemplary embodiment, a method for operating an operating circuit for powering a lamp, which comprises at least one light emitting diode, is defined. The operating circuit has a primary side and a secondary side galvanically isolated therefrom. The method comprises a clocked switching of at least one controllable switch of a converter. The method comprises a determination of an output voltage of the operating circuit as a function of a voltage at an inductor on the primary side of the converter, wherein the inductor is inductively coupled to a secondary coil of the secondary side of the converter.

The output voltage can be determined with the method as a function of the voltage at the inductor, and as a function of an output current of the operating circuit. As a result, any voltage drop between the secondary coil and an output of the operating circuit can be taken into account.

The output voltage can be determined with the method as a function of a maximum value of the voltage at the inductor and as a function of the output current. The maximum value can be determined, respectively, in at least every second switching cycle of the clocked converter.

The output voltage can be determined with the method as the difference between the maximum value of the voltage and a voltage correction value that is a function of the output current.

A diode may be provided between the secondary coil and an output of the operating circuit. The voltage correction value can be a product of the output current and a differential resistor of the diode.

The method may comprise a measurement of the output current using a transformer. The transformer may comprise at least one secondary side inductor, which is interconnected between the secondary coil and the diode, and a primary side inductor that is inductively coupled thereto.

The at least one controllable switch of the converter can be switched in a clocked manner as a function of the determined output voltage.

A switching frequency and/or switching threshold value for a switching of the at least one controllable switch can be set as a function of the output voltage.

The at least one controllable switch can be switched in a clocked manner, such that a power regulation and/or power limitation of an output power of the operating circuit occurs as a function of the output voltage.

The inductor, which is inductively coupled to the secondary coil, may differ from a primary coil of the converter.

The method can be automatically executed by an operating circuit or the LED converter according to an exemplary embodiment.

The invention shall be explained in greater detail below, with reference to the attached drawings, based on preferred exemplary embodiments.

DETAILED DESCRIPTION

The invention shall be described in greater detail below, based on exemplary embodiments, taking the figures into account, in which identical reference symbols represent identical or corresponding elements. The features of various exemplary embodiments may be combined with one another, as long as this is not expressly prohibited in the description. Even when some exemplary embodiments are described in greater detail in the context of specific applications, e.g. in the context of operating devices for LED modules, the exemplary embodiments are not limited to these applications.

Figure 1:
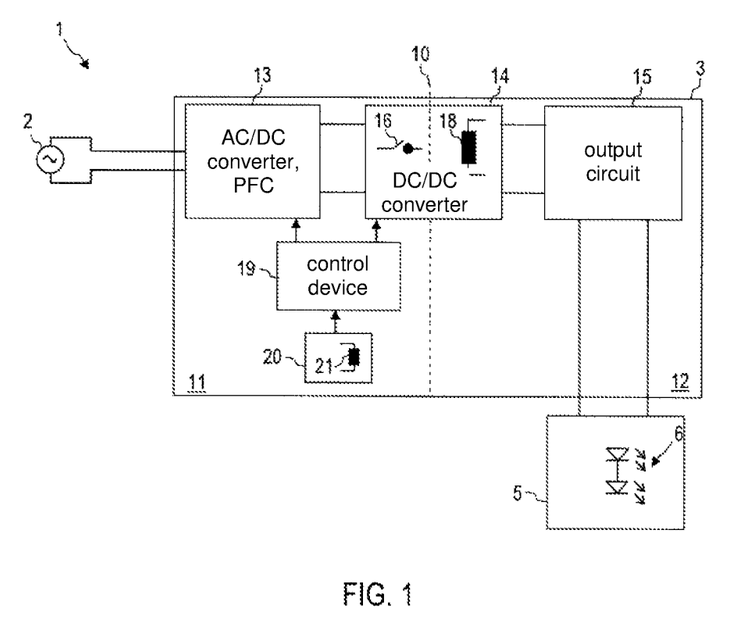
FIG. 1 shows a schematic depiction of a lighting system having an LED converter according to an exemplary embodiment.

FIG. 1 shows a system 1, in which an LED converter 3 according to an exemplary embodiment supplies a lamp 5 with power. The lamp 5 can comprise one light emitting diode (LED) or numerous LEDs. The LEDs 6 may be inorganic or organic LEDs.

The LED converter 3 is coupled on the input side with a supply voltage source 2, when in operation, e.g. a mains voltage. The LED converter 3 may comprise a rectifier 13. The LED converter 3 may optionally comprise a power factor correction circuit (PFC: Power Factor Correction) 13. The LED converter 3 comprises a converter 14, which is a DC/DC converter.

The converter 14 is designed as a clocked converter, and has a controllable switch 16. The controllable switch 16 can be a power switch. The control switch 16 can be a transistor with an isolated gate electrode. The controllable switch 16 can be a MOSFET. As shall be explained comprehensively below, the converter 14 is a primary side, clocked converter, with the controllable switch 16 switched in a clocked manner by a control device 19. Although only one controllable switch 16 is schematically depicted in FIG. 1, the converter 14 may also have numerous primary side controllable switches, e.g. for a half-bridge activation of the converter 14.

The converter 14 has galvanic isolation, such that a primary side of the converter 14 and a secondary side of the converter 14 are galvanically isolated. As a result, an electrical isolation exists between different regions 11, 12 of the LED converter. The output side 12 having the secondary side of the converter can be designed as a SELV (Separated Extra Low Voltage) region, and can be isolated from the input side 13 by a SELV barrier 10. The electrical barrier 10 must not necessarily be a SELV barrier, but instead, can also be another electrical barrier.

The LED converter 3 can optionally have an output circuit 15, which is coupled to a secondary coil 18 of the converter 14.

The LED converter 3 is configured to determine an output voltage at an output of the LED converter 3 by means of a voltage measurement carried out on the primary side 11. For this, the operating circuit of the LED converter may comprise a device 20 for determining the output voltage. The device 20 comprises an inductor 21, which is disposed on the primary side 11 of the operating circuit, and is thus galvanically isolated from the output of the operating circuit. The inductor 21 is inductively coupled to the secondary coil 18 of the converter 14.

As shall be explained in greater detail below, a voltage at the inductor 20 can be measured and further processed, in order to determine the output voltage. A maximum value of the voltage can be measured at the inductor 20. The maximum value of the voltage at the inductor 20 itself, or a value derived therefrom can be used as the parameter for the output voltage. By way of example, a correction value can be subtracted from the maximum value of voltage at the inductor 20, which is measured in one or more switching cycles of the clocked converter 14. The correction value may be a function of the output current of the LED converter 3.

The inductor 21 may differ from a primary coil (not shown in FIG. 1) of the converter 14. The device 20 can be configured such that the primary side voltage measurement does not occur on the primary coil of the converter itself, but rather on an inductor 21 differing therefrom. The chance of an error due to leakage inductors can thus be reduced. The output voltage can be reliably determined.

The inductor 21 can be disposed, closely coupled to the primary coil and the secondary coil of the converter 14. The inductor 21 can be disposed on the same transformer core as the secondary coil 18 and the primary coil of the converter 14.

The device 20 can comprise a voltage divider for tapping into the voltage at the inductor 21. The voltage divider can be a resistive voltage divider.

As is schematically depicted in FIG. 1, the output voltage can be determined with the LED converter 3, without having to carry out a measurement on the SELV side, and/or without having to return a corresponding measurement result over the SELV barrier. The control device 19 can be configured such that it determines the output voltage of the LED converter 3 as a function of a voltage measured on the primary side, and the determination can be used for a power regulation.

Figure 2:
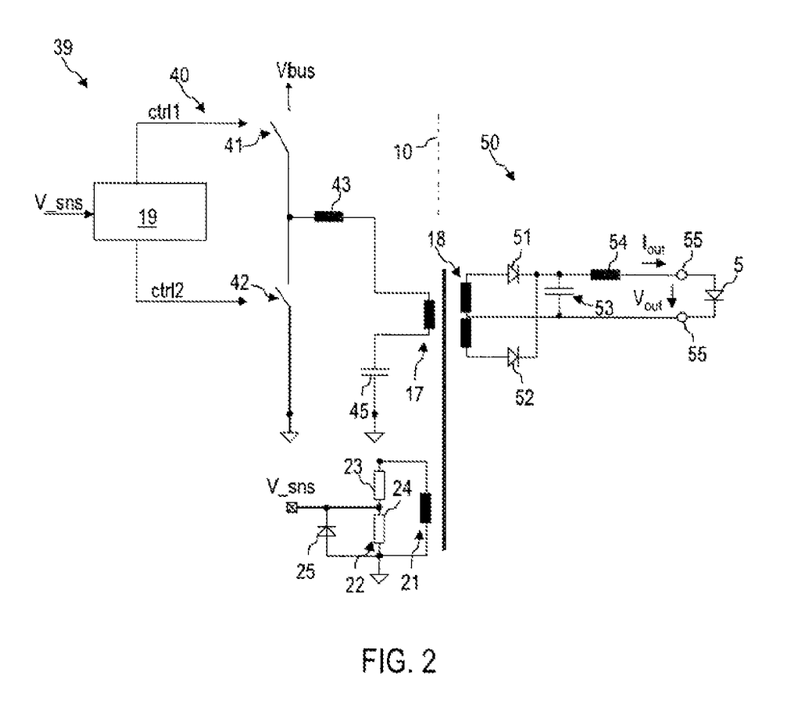
FIG. 2 shows a circuit diagram of an operating circuit according to an exemplary embodiment.

FIG. 2 is a circuit diagram of an operating circuit 39 according to an exemplary embodiment. The operating circuit 39 comprises a converter having a primary side circuit 40 and a secondary side circuit 50. There is an electrical isolation between the primary side circuit 40 and the secondary side circuit 50. A transformer having a primary coil 17 and a secondary coil 18 may be provided for the isolation.

The converter can be designed as an LLC resonance converter. The main inductor of the transformer can act as one of the inductors of the LLC resonance circuit. A separate inductive element 43 or a leakage inductor of the transformer can act as a further inductor of the LLC resonance circuit. A capacitive element or a leakage capacitor can form a capacitor of the LLC resonance circuit. In accordance with the general terminology in this technical field, the term "LLC resonance circuit" or "LLC resonance converter" is used here to indicate a resonance circuit having two inductors and one capacitor, or a corresponding converter, wherein it is of no importance whether one of the inductors is interconnected between the capacitor 45 and the inductor 43, as is shown in FIG. 2, or the capacitor is interconnected between the two inductors. Likewise, the inductor 43 may be integrated in the primary coil 17 of the transformer as a leakage inductor.

The converter is a DC/DC converter. The secondary side circuit 50 can be a SELV region, which is isolated from the primary side region by a SELV barrier 10. The primary side circuit may contain all of the components that do not belong to the SELV region.

The primary side circuit 40 comprises a half-bridge circuit having a first switch 41, which can be a power switch, and a second switch 42, which can be a power switch. The first switch 41 and the second switch 42 may be identical, and the half-bridge circuit can be designed as a symmetrical half-bridge circuit. The resonance circuit is connected to a node between the first switch 41 and the second switch 42. The resonance circuit is connected to the middle of the half-bridge circuit between the switches 41 and 42. A first terminal of the first inductor 43 of the LLC resonance circuit may be connected to the node between the first switch 41 and the second switch 42 of the half-bridge circuit. A second terminal of the first inductor 43 can be connected to a first terminal of another inductor of the LLC resonance circuit. A second terminal of the other inductor can be connected to the capacitor 45 of the resonance circuit.

When the converter 39 is in operation, the control device 19 controls the first switch 41 and the second switch 42. Each of the switches can each be switched on and off with the same predefined frequency thereby. The control device 19 can control the first switch 41 and the second switch 42 such that only one of the two switches is ever activated at a time. The first switch 41 and the second switch 42 can be operated in an alternating, clocked manner by the control device. A downtime between the switching off of one switch and the switching on of the respective other switch may be short, in particular, it may be much shorter than the inverse of the switching sequence.

The primary side circuit 40 is configured such that a voltage V_sns can be measured that is induced at the inductor 21. The inductor 21 differs from the primary coil 17, such that the voltage measurement does not occur directly on the primary coil 17. The inductor 21 is inductively coupled to the secondary coil 18.

The secondary side circuit 50 has a rectifier connected to the secondary coil 18, which can be formed, by way of example, by a first diode 51 and a second diode 52. An output capacitor 53 may be provided. The output capacitor 53 can be coupled directly to an output 55 of the operating circuit, or via an optionally existing inductor 54.

A load 5 connected to the output 55 of the operating circuit can comprise an LED, an LED line, numerous LEDs, or numerous LED lines. The LEDs can be LEDs of an LED module.

The output voltage at the output 55 of the operating circuit is determined on the basis of the voltage V_sns measured in the primary side circuit 40. The voltage V_sns measured in the primary side circuit 40 at the inductor 21 is supplied to the control device 19. The voltage V_sns measured in the primary side circuit 40 at the inductor 21 can be A/D converted, before it is supplied to the control device 19.

When the switches 41, 42 of the half-bridge circuit are activated, energy is transferred, until the capacitor 53 is charged. The load 5 binds the voltage at the capacitor 53 to a value corresponding to the forward voltage of the LEDs of the lamp. The voltage at the secondary coil corresponds to the output voltage of the circuit, minus the voltage dropping via the rectifier diodes 51, 52.

Accordingly, information regarding the output voltage at the output 55 can be derived from the maximum value of the voltage occurring at the secondary coil 18 when the switches 41, 42 are activated. For this, the maximum value of the voltage at the inductor 21 is measured via a voltage divider 22.

The voltage divider 22 can be a high resistance voltage divider. The voltage divider 22 can be a resistive voltage divider having at least two resistors 23, 24. A diode can be optionally provided, parallel to a resistor 24 of the voltage divider. The diode 25 can serve as protection for a downstream A/D converter and/or a downstream integrated half-bridge circuit, e.g. the control device 19, in order to delimit negative voltages in the two switching phases to a minimum voltage. In the case of negative voltages, the voltage is limited to the forward voltage of the diode.

The voltage V_sns at the resistor 24 can be supplied to the control device 19, optionally after an A/D conversion.

In order to determine the output voltage of the operating circuit 39, the forward voltage of the rectifier diodes 31, 32 may be taken into account. The output voltage can be determined as $$V_{out}=V\_sns-V_c(I_{out}) \quad (1)$$

wherein V_sns is the maximum value of the voltage measured at the inductor 21 via the voltage divider 22, and $V_c(I_{out})$ is a correction term that is a function of the output current of the operating circuit.

The output voltage can be determined, for example, as $$V_{out}=V\_sns-R_{diff}*I_{out} \quad (2)$$

wherein $R_{diff}$ is the differential resistor of the rectifier diodes 51, 52.

With the determination of the output voltage, the target value of a current regulation may be used for the output current $I_{out}$. Alternatively, the output current $I_{out}$ can also be measured with another transformer, as shall be described in greater detail with reference to FIG. 3.

In further exemplary embodiments, the voltage at the rectifier diodes 51, 52 can be ignored, and the correction term $V_c(I_{out})$ in equation (1) can be set to zero.

The output voltage, determined based on the voltage at the inductor 21, can be used for different purposes. By way of example, error statuses, such as a short circuit at the output 55 or a disengaged output 55 or a voltage surge at the output 55, can be detected. An emergency stop or power limitation of the output power may occur, depending on the voltage at the inductor 21.

The voltage at the inductor 21 can also be used as a control variable for power control. A regulating of the output power of the operating circuit can thus occur with the voltage measured on the primary side at the inductor 21.

Figure 3:
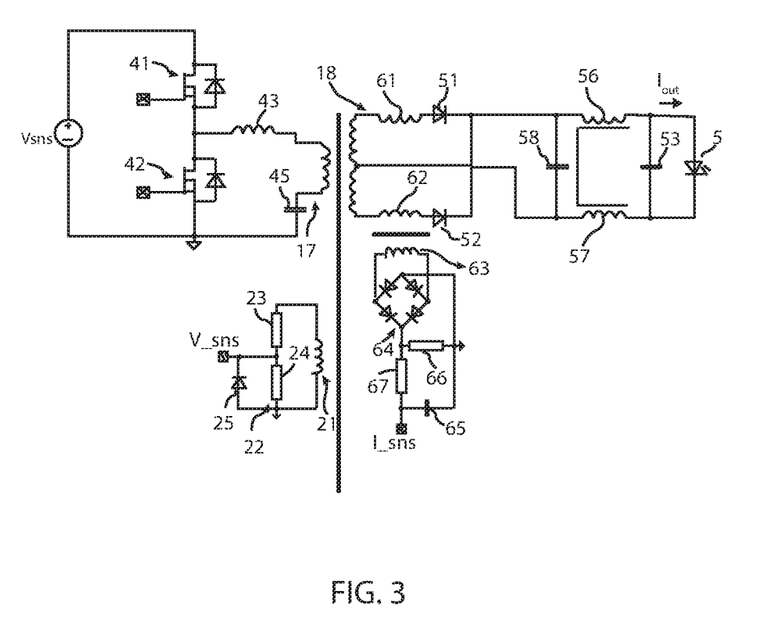
FIG. 3 shows a circuit diagram of an operating circuit according to another exemplary embodiment.

FIG. 3 is a circuit diagram of an operating circuit according to another exemplary embodiment.

The operating circuit is configured such that an output current of the operating circuit can be determined by means of a measurement. A transformer for the current measurement is provided, which comprises at least one inductor 61, 62. The at least one inductor 61, 62 can be interconnected between the secondary coil 18 and the rectifier diodes 51, 52. There may be a first inductor 61 in the path between the secondary coil 18 and the rectifier 51. There may be a second inductor 62 in the path between the secondary coil 18 and the rectifier diode 52.

The first inductor 61 and the second inductor 62 can be inductively coupled via the electrical barrier to an inductor 63 of the transformer for the current measurement. The inductor 63 is provided on the primary side of the operating circuit. The inductor can be connected to a capacitor 65 via a rectifier 64 and a resistor 67. Another resistor 66 can be connected in parallel to the capacitor 65. The voltage at the capacitor 65 is proportional to the output current, and depicts a measurement value I_sns, which can be measured on the primary side of the operating circuit, and represents the output current.

The rectifier 64 can also be designed as an active rectifier, for example. The active rectifier can be formed, for example, by four active rectifier switches, e.g. MOSFET or bipolar transistors. The control device 19 can activate/deactivate a first diagonal of the active rectifier synchronously with the first switch 41 of the converter 14, and wherein the control device 19 activates/deactivates a second diagonal of the active rectifier synchronously with the second switch 42 of the converter 14, and wherein, in each case, only the first or the second diagonal is active. With regard to the assembly and the function of this variation, reference is made to German application DE 102014214744.1 published Jan. 28, 2016 as DE 10 2014 214 744, and in particular to FIG. 6 and the associated description. See also PCT application PCT/EP2015/066049 filed Jul. 14, 2015 and published as WO 2016/015995 on Feb. 4, 2016.

In an alternative variation, the active rectifier can also be formed by two active rectifier switches. The circuit having two rectifier switches can be designed such that the control device 19 can connect the inductor 63 of the transformer to a ground by activating a first rectifier switch synchronously with the second switch 42 of the converter 14, or by activating a second rectifier switch synchronously with a first switch 41 of the converter 14. With regard to the assembly and function of this variation, reference is made to German application DE 102014214746.8, published Jan. 28, 2016 as DE 10 2014 214 746, and in particular to FIG. 6 and the associated description. See also PCT application PCT/EP2015/066630 published Feb. 4, 2016 as WO 2016/016044.

The measurement value I_sns, which represents the output current of the operating circuit, can be used in combination with the voltage V_sns measured at the inductor 63 in order to determine the output voltage of the operating circuit. By way of example, the output voltage can be determined according to equation (2).

The operating circuit can optionally comprise a capacitor 58 and/or at least one inductor 56, 57 on the secondary side. These components could also be omitted. By way of example, depending on whether the operating circuit is to be operated as a constant current source or as a constant voltage source, the inductor 56, 57 may be omitted.

With the circuits described in greater detail in reference to FIG. 2 and FIG. 3, the voltage V_sns can be sampled in each case, in order to determine a maximum value of the voltage at the inductor 21. The diode 25 binds a negative voltage, such that the determination of the maximum value can be executed in every second half-wave at positive voltages. Optionally, a correction term, as a function of the output current of the operating circuit, can be subtracted from the respective determined maximum value, in order to determine the output voltage.

To determine the maximum value of the voltage at the inductor 21, which is measured via the voltage divider 22, an A/D conversion and digital processing can occur in each case.

Figure 4:
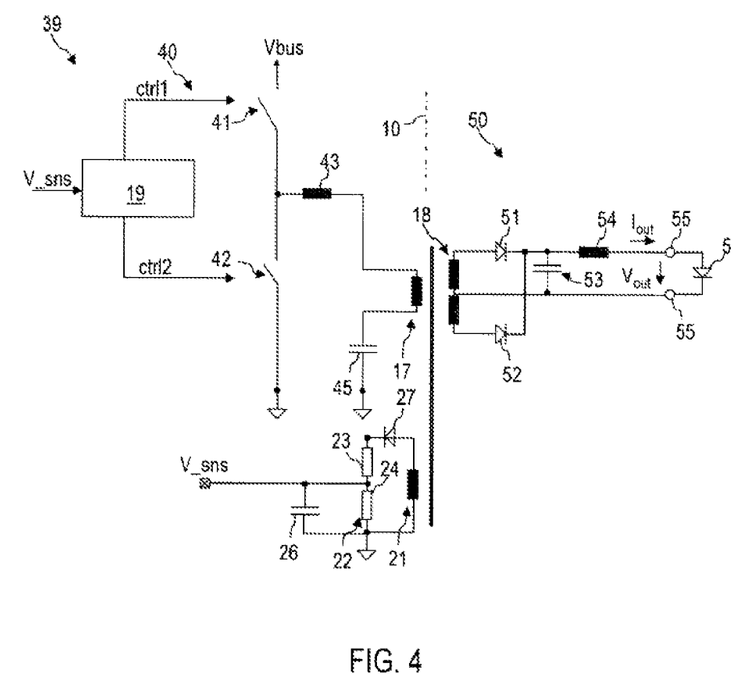
FIG. 4 shows a circuit diagram of an operating circuit according to another exemplary embodiment.

In further designs, a capacitor may be provided in parallel to the resistor 22, as shall be explained in greater detail in reference to FIG. 4.

FIG. 4 is a circuit diagram of an operating circuit according to another exemplary embodiment. The device for determining the output voltage comprises a capacitor 26, which is connected in parallel to a resistor 24 of the voltage divider 22. A diode 27 is provided between the voltage divider 22 and the inductor 21. The capacitor 26 is connected in parallel to one of the resistors of the voltage divider 22, e.g. in parallel to the resistor 24.

The capacitor 26 is charged, respectively, in a phase of each switching cycle, via the diode 27 and the resistor 23. The capacitor 26 serves as a low pass filter. A voltage is present at the capacitor 26, which represents the maximum value of the voltage at the inductor 21. When the output voltage of the operating circuit changes, the capacitor can discharge slowly via the resistor 24, until the voltage at the capacitor 26 again exhibits a value representing the output voltage of the operating circuit.

The voltage at the capacitor 26 is a DC voltage, which represents the maximum voltage of the voltage induced at the inductor 21. This voltage can be supplied to the control device 19. A temporal sampling and determination of the maximum value of the voltage no longer necessarily needs to be carried out.

Figure 5:
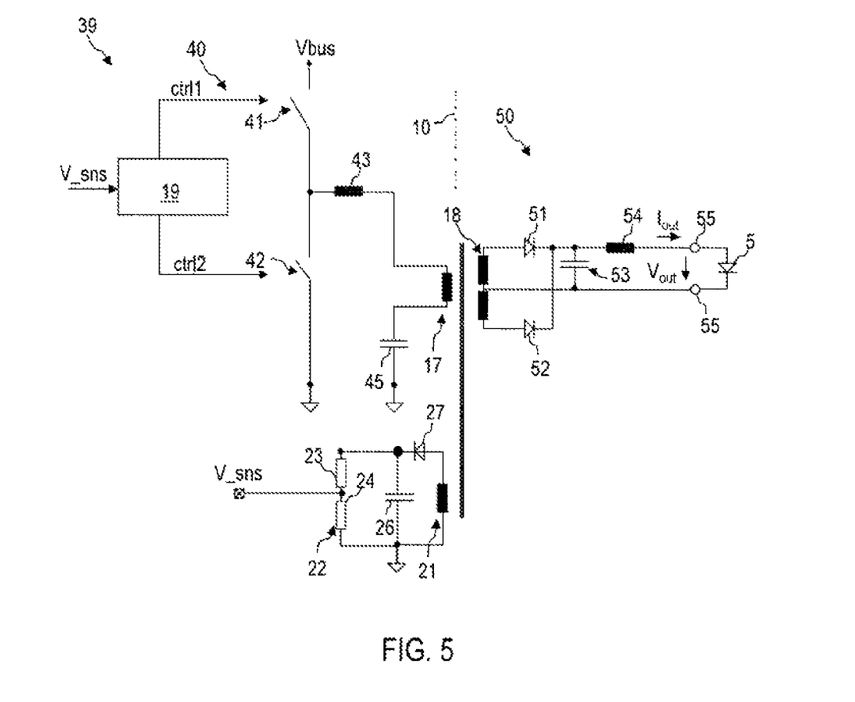
FIG. 5 shows a circuit diagram of an operating circuit according to another exemplary embodiment.

FIG. 5 is a circuit diagram of an operating circuit according to another exemplary embodiment. The device for determining the output voltage comprises a capacitor 26, which is connected in parallel to the voltage divider 22. A diode 27 is provided between the capacitor 26 and the inductor 21.

The capacitor 26 is charged, respectively, in a phase of each switching cycle via the diode 27. There is a voltage at the capacitor 26 that represents the maximum value of the voltage at the inductor 21. When the output voltage of the operating circuit changes, the capacitor 26 can be slowly discharged via the resistors 23, 24, until the voltage at the capacitor again exhibits a value representing the output voltage of the operating circuit.

The voltage at the capacitor 26 is a DC voltage, which represents the maximum voltage of the voltage induced at the inductor 21. This voltage can be supplied to the control device 19 via the voltage divider 22. A temporal sampling and determination of the maximum value of the voltage no longer necessarily needs to be carried out.

Figure 6:
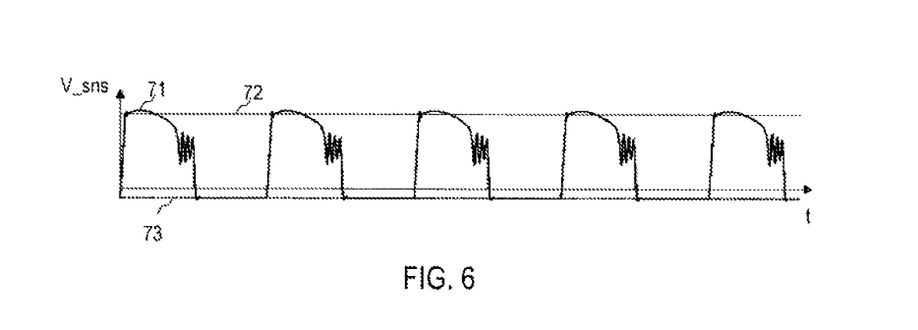
FIG. 6 illustrates a voltage measured on a primary side of a converter for determining the output voltage.

FIG. 6 shows an exemplary voltage V_sns at the resistor 24, as can be measured, for example, with the circuits from FIG. 2 or FIG. 3. The diode 25 binds negative half-waves in a negative terminal voltage 73. The voltage V_sns at the resistor 24 has a temporal curve. A maximum value 71 of the voltage in the positive half-waves represents a value that is slightly greater than the output voltage 72 of the operating circuit.

The maximum value 71 of the voltage can be determined by sampling after a D/A conversion, or through a low pass filtering, as described in reference to FIG. 4.

The maximum value 71 of the voltage at the inductor 21 can be used as a measure for the output voltage, or it can be corrected by a correction term, which is a function of the output current of the operating circuit.

Figure 7:
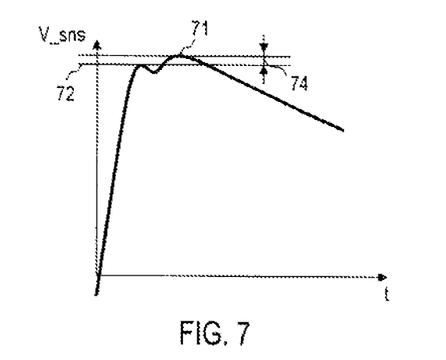
FIG. 7 illustrates the determination of the output voltage as a function of the voltage measured on the primary side.

FIG. 7 shows an enlarged depiction of the voltage at the inductor 21, which is measured via the voltage divider 22. A correction term 74 can be subtracted from the maximum value 71 in order to determine the output voltage 72. The correction term 74 can be a function of the output current, and in particular, can be proportional to the output current. The correction term 74 can take into account the voltage dropping via the rectifier diodes 51, 52.

The output voltage, which is determined via the voltage dropping at the inductor 21, can be used in different ways for control or regulation. The voltage dropping at the inductor 21, or a value derived therefrom, can be used as the control variable for a power regulation loop, with which the output power of the operating circuit is regulated. The voltage dropping at the inductor 21, or a value derived therefrom, can be used for detection of the error statuses, e.g. for detecting a short circuit at the output 55, a disengaged output 55, or a voltage surge at the output 55.

Figure 8:
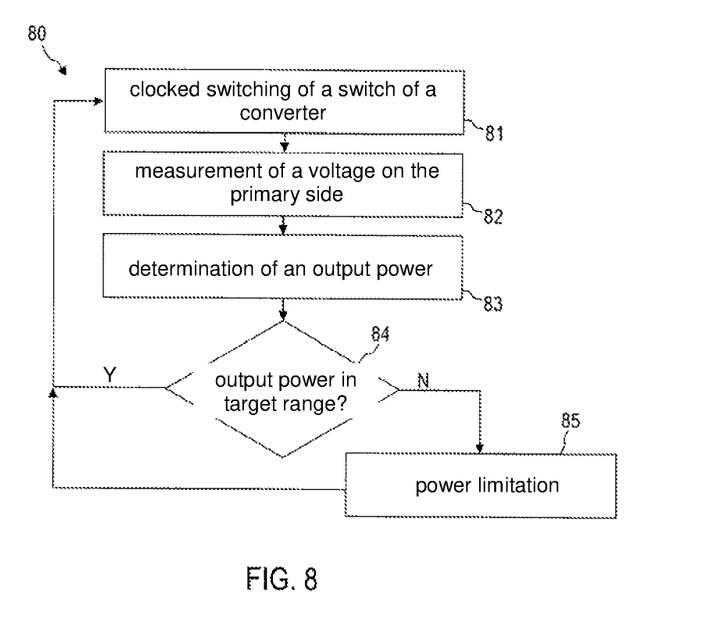
FIG. 8 is a flow chart of a method according to an exemplary embodiment.

FIG. 8 is a flow chart of a method 80 according to an exemplary embodiment.

In step 81, at least one switch of a converter is switched in a clocked manner.

In step 82, a voltage at an inductor 21 on the primary side of the operating circuit is measured. The inductor 21 is inductively coupled to the secondary coil 18 of the converter. The inductor 21 differs from the primary coil of the converter. The measured voltage can be a maximum value of the voltage at the inductor 21, which is tapped into via a voltage divider 22.

In step 83, the output power of the operating circuit is determined, based on the measured voltage. For this, a correction term that is a function of the output current can be subtracted from the measured maximum value of the voltage at the inductor 21. The correction term can be determined as a function of a target value of a current regulation loop. The correction term can be determined in that the actual output current is measured, e.g. via another transformer 61, 62, 63. The output power can be determined from the output voltage and the output current.

In step 84, it is possible to check whether the output power lies within an acceptable range. For this, it is possible to determine whether the output power is greater than a first threshold value, and/or less than a second threshold value. The second threshold value can be greater than the first threshold value. If the output power lies within the acceptable range, the method goes back to step 81.

If it is determined in step 84 that the output power does not lie within the acceptable range, a procedure for limiting the power can be executed in step 85. By way of example, the power limitation can occur such that the output power is always greater than the first threshold value, or at least remains equal to the first threshold value. For this, a dimming to lower currents can be prevented, or the output current can be returned to a higher current strength, if the output power for the determined output voltage is already equal to the first threshold value. Alternatively, or additionally, the power limitation can occur such that the output power is always lower than the second threshold value, or at most, remains equal to the second threshold value. For this, a dimming to higher currents can be prevented, for example, or the output current can be reduced to a lower current strength, if the output power for the determined output voltage is already equal to the second threshold value.

Although exemplary embodiments have been described in reference to the figures, variations can still be implemented in other exemplary embodiments. Although the maximum voltage that occurs at an inductor that is inductively coupled to the secondary coil of the transformer can be used as an indicator for the output voltage of the operating circuit, other parameters can also be used for determining the output voltage.

Inductors or capacitors can be formed respectively through corresponding inductive or capacitive elements, e.g. as coils or capacitors. It is, however, also possible that smaller inductors, e.g. the smaller inductor of the LLC resonance circuit, are designed as leakage inductors. Likewise, smaller capacitors can be designed as leakage capacitors.

The converters and methods according to exemplary embodiments can be used in particular for supplying a lamp, which comprises LEDs.

What is claimed is:

1. An operating circuit for powering a lamp (5), which comprises at least one light emitting diode (6), wherein the operating circuit has a primary side (11) and a secondary side (12) galvanically isolated therefrom, and wherein the operating circuit comprises:
    a clocked converter (14), which comprises a primary coil (17) and a secondary coil (18);
    a detection device (20) for measuring a voltage ($V_{sns}$) on the secondary side of the operating circuit, wherein the detection device (20) comprises an inductor (21) disposed on the primary side (11) of the operating circuit, which is inductively coupled to the secondary coil (18) of the clocked converter (14);
    a control device (19) that receives a signal representing the measured voltage (V_sns) on the secondary side of the operating circuit and controls switching of the clocked converter (14) to adjust an output voltage (Vout) at an output of the operating circuit for the lamp; and
    wherein the control device (19) is configured to determine the output voltage ($V_{out}$) as a function of a maximum value (71) of the measured voltage at the inductor (21) and a voltage correction value (74) that is a function of the output current.

2. The operating circuit according to claim 1 wherein a diode (51, 52) is provided between the secondary coil (18) and the output (55) of the operating circuit, wherein the voltage correction value (74) is a product of the output current ($I_{out}$) and a differential resistor resistance of the diode.

3. The operating circuit according to claim 1, further comprising a current transformer (61, 62, 63) for measuring the output current ($I_{out}$).

4. The operating circuit according to claim 3 further comprising a current measuring circuit having an active rectifier (64) controlled by the control device (19).

5. The operating circuit according to claim 1, wherein the operating circuit is configured to switch, in a clocked manner, at least one controllable switch (41, 42) of the converter (14), as a function of the determined output voltage ($V_{out}$).

6. The operating circuit according to claim 1, wherein the operating circuit is configured for a power regulation and/or a power limitation of an output power of the operating circuit, as a function of the determined output voltage ($V_{out}$).

7. The operating circuit according to claim 1, wherein the inductor (21) differs from the primary coil (17).

8. The operating circuit according to claim 1, wherein the converter (14) is a primary side, clocked LLC resonance converter (14) having a half-bridge activation.

9. A method for operating an operating circuit for powering a lamp (5), which comprises at least one light emitting diode (6), wherein the operating circuit has a primary side (11) and a secondary side (12), galvanically isolated therefrom, and wherein the method comprises:
    a clocked switching of at least one controllable switch of a converter (14), which comprises a primary coil (17) and a secondary coil (18), and
    determining an output voltage ($V_{out}$) of the operating circuit as a function of a voltage at an inductor (21) and as a function of an output current ($I_{out}$) of the operating circuit, wherein the inductor (21) is disposed on the primary side (11) and is inductively coupled to the secondary coil (18)
    wherein the output voltage ($V_{out}$) is determined as a function of a maximum value (71) of the voltage at the inductor (21) and a voltage correction value (74) that is a function of the output current.

10. The method according to claim 9, wherein the inductor (21) differs from the primary coil (17).

11. The method according to claim 9 wherein a diode (51, 52) is provided between the secondary coil (18) and an output (55) of the operating circuit and the voltage correction value (74) is a product of the output current ($I_{out}$) and a differential resistance of the diode.

12. The method according to claim 9 wherein the output current is measured with a current transformer (61, 62, 63) and a signal from the transformer is processed through at least an active rectifier (64).

* * * * *